Patented Oct. 17, 1939

2,176,785

UNITED STATES PATENT OFFICE 2,176,785

PROCESS OF GLUTAMIC ACID PRODUCTION

Géza Braun, New York, N. Y., assignor to Standard Brands Incorporated, New York, N. Y., a corporation of Delaware No Drawing. Application September 2, 1936, Serial No. 99,166

12 Claims. (Cl. 260—529)

My invention relates to the manufacture of glutamic acid and has for an object the obtainment of high yields of glutamic acid from initial materials such as wheat gluten by a process in which the desired reactions for glutamic acid formation are effected in less time, and with greater economy in the quantity of reagents used and heat employed for the glutamic acid production, than in the case of various of the most nearly similar processes heretofore used for glutamic acid production.

A further object of my invention is a more complete and economical recovery of the glutamic acid formed than has been attained in various previously known processes.

In a specific embodiment of my invention, to the precise details of which, however, the invention is not limited, wet wheat gluten (containing about 66% water) is mixed with about two-fifths its weight of an aqueous hydrochloric acid solution of about 30% strength, thus forming a mixture the aqueous content of which is therefore a hydrochloric acid solution of about 10% HCl strength (the 30% HCl strength solution initially added being, of course, diluted by the water present in the wet wheat gluten employed, and this mixture containing wheat gluten, hydrochloric acid and water is then heated, suitably for a period of approximately six hours and at a temperature of about 125° C. (the heating being preferably under a pressure of about 20 pounds pressure per square inch, in any suitable acid-resisting apparatus, if it is desired to attain and maintain a temperature of about 125° C.).

By carrying out the process as described in the preceding paragraph at a somewhat higher temperature, namely, at about 160° to about 165° C. and under a corresponding pressure which may be about 85 pounds per square inch, the reaction may be completed in about one hour.

By such procedure, besides other amino-acids and some ammonia, glutamic acid is formed from the wheat gluten and, as formed, these products unite chemically with a portion of the hydrochloric acid present, forming products including glutamic acid hydrochloride and thereby reducing the concentration of the remaining free hydrochloric acid in the aqueous or liquid phase of the reaction mixture to about four percent (4%) at the completion of the glutamic acid-forming reaction.

On the completion of the glutamic acid hydrochloride-forming process as just described, insoluble matter present, including so-called melanin, is separated by filtration, and the resulting filtrate is preferably extracted with a solvent such as benzene or carbon tetrachloride to remove oleaginous substances and may then be mixed with decolorizing carbon if necessary or desirable and filtered to remove discoloring substances and such impurities as are adsorbed or absorbed by the decolorizing carbon, and the decolorized filtered solution, containing the glutamic acid hydrochloride and remaining free hydrochloric acid, is then heated, preferably under reduced pressure, to effect distillation of hydrochloric acid and water and to obtain a thick syrupy residue containing the glutamic acid hydrochloride in solution. The free hydrochloric acid distils together with water and by this distillation a constant boiling point aqueous hydrochloric acid of about 21% HCl strength may be recovered and may be re-used for the treatment of additional gluten for further glutamic acid production.

In such further use of the hydrochloric acid, recovered in the form of an aqueous solution of about 21% strength, an initial hydrochloric acid content of the gluten-hydrochloric acid mixture approximately the same as in the initial treatment above described may be attained either by evaporating some of the water from the wet gluten to be treated by the recovered hydrochloric acid or by treating a further quantity of wet gluten containing approximately 66% of water, as initially, together with a sufficient quantity of the 21% strength hydrochloric acid to give, as in the above described initial treatment, a ratio of free hydrochloric acid to free water present of about one to nine, a greater quantity of the 21% strength acid being, of course, required than would be required of the 30% strength hydrochloric acid if the latter were used for the treatment of additional wet wheat gluten containing about 66% moisture. For the treatment of wheat gluten in accord with my present invention in its preferred embodiment, and when employing a time and temperature of treatment approximately as stated in the above specific example, the ratio of free hydrochloric acid to free water initially present in the reaction mixture may be varied slightly without substantial reduction in the yield of glutamic acid obtainable as in the case of the above specified example.

The syrupy residue containing glutamic acid hydrochloride (chiefly in crystalline form) remaining after the distillation of the free hydrochloric acid as above mentioned is now treated for the recovery therefrom of glutamic acid hydrochloride. For this purpose, the syrupy residue may be mixed with about half its volume of a concentrated aqueous hydrochloric acid solution (suitably an acid of about 32% HCl strength) which serves as a precipitating agent for the glutamic acid hydrochloride present in the syrupy residue to such an extent that, on cooling to a temperature of about 0° C. after such an acid addition, nearly all of the total glutamic acid present separates (still in the form of glutamic acid hydrochloride, of course) on standing for about 10 hours with continuous or intermittent stirring. The crystalline product thus separated may be filtered out of the associated liquid and further treated for the obtainment of free glutamic acid or such glutamic acid salts or derivatives as may be desired by methods certain of which are in themselves well known processes and which form no part of the invention which I claim in this present application.

The filtrate or mother liquor remaining after the separation of the glutamic acid hydrochoride as just mentioned containing a very small proportion of the glutamic acid formed in the process, may be further treated, if desired, for the recovery of the small proportion of remaining additional glutamic acid or other values which it contains.

By a process as hereinbefore described, it has been found readily possible to obtain a yield of about 12 parts of glutamic acid hydrochloride for each 100 parts of wet wheat gluten containing about 66% of water, that is to say a yield of about 36% glutamic acid hydrochloride calculated on a dry gluten basis.

In the claims, where mention is made of the "manufacture of glutamic acid" and of "recovering glutamic acid", these expressions are used in a generic significance to include the manufacture and recovery of glutamic acid in the form of its hydrochloride or other glutamic acid compound formed or in the form of free glutamic acid itself as the ultimate product, as will, it is believed, be obvious to chemists familiar with the most nearly similar known processes from which the applicant's present invention is distinguished.

What I claim as my invention and desire to secure by Letters Patent is:

1. In a process of manufacture of glutamic acid, the steps which comprise mixing undried wheat gluten with such a proportion of concentrated aqueous hydrochloric acid solution as will, when diluted by the water present in the undried wheat gluten, form a hydrochloric acid solution of approximately ten per cent strength in the resulting mixture, and heating the mixture to a reacting temperature effective for the production of glutamic acid hydrochloride and at which the glutamic acid hydrochloride formed is stable in the reaction mixture, until a substantial proportion of glutamic acid is formed and until sufficient of the hydrochloric acid initially present has combined with the products formed to reduce the concentration of the aqueous phase of the mixture from its initial strength of approximately ten per cent hydrochloric acid to a strength of approximately four per cent hydrochloric acid, and then recovering glutamic acid from the resulting product.

2. A process as defined in claim 1, in which the reaction is effected by heating the materials at a temperature of about 125° C.

3. A process as defined in claim 1, in which the reaction is effected under a pressure of about 20 pounds per square inch.

4. A process as defined in claim 1, in which the residual hydrochloric acid remaining in solution after the completion of the glutamic acid-forming reaction is recovered by distillation with such a proportion of associated water as to constitute a distillate of about twenty-one per cent strength hydrochloric acid.

5. A process as defined in claim 1, in which the reaction is effected by heating the materials at a temperature of about 160° to about 165° C.

6. A process as defined in claim 1, in which the reaction is effected under a pressure of about 85 pounds per square inch.

7. In a process of manufacture of glutamic acid, the steps, in combination, which comprise mixing undried wheat gluten, including gluten associated with about twice its weight of water, with such a proportion of hydrochloric acid of substantially greater than ten per cent strength as will, when diluted by the water present in the said admixed undried wheat gluten, form a hydrochloric acid solution of approximately ten per cent strength in the resulting gluten-aqueous acid mixture, and heating the mixture thus constituted to a reacting temperature, effective for the production of glutamic acid hydrochloride and at which glutamic acid hydrochloride formed is stable in the reaction mixturde, until a substantial proportion of glutamic acid hydrochloride is formed and until the hydrochloric acid concentration of the remaining aqueous phase of the resulting reaction products has been reduced to about four per cent, and then recovering glutamic acid from the resulting product.

8. A process as defined in claim 7 in which the reaction is effected by heating the materials at a temperature of about 125° C.

9. A process as defined in claim 7 in which the reaction is effected under a pressure of about 20 pounds per square inch.

10. A process as defined in claim 7 in which the residual hydrochloric acid, remaining in solution after the completion of the glutamic acid-forming reaction, is recovered by distillation with such a proportion of associated water as to constitute a distillate of about twenty-one per cent strength hydrochloric acid.

11. A process as defined in claim 7 in which the reaction is effected by heating the materials at a temperature of about 160° to about 165° C.

12. A process as defined in claim 7 in which the reaction is effected under a pressure of about 85 pounds per square inch.

GÉZA BRAUN.